United States Patent [19]

Sink

[11] 4,148,385
[45] Apr. 10, 1979

[54] COUPLING DEVICE WITH SPRING DAMPER

[75] Inventor: William H. Sink, Auburn, Ind.

[73] Assignee: Dana Corporation, Toledo, Ohio

[21] Appl. No.: 821,669

[22] Filed: Aug. 4, 1977

[51] Int. Cl.² .............................................. F16D 3/14
[52] U.S. Cl. ................................ 192/106.1; 64/27 B; 64/27 F
[58] Field of Search ...................... 192/106.1; 64/27 R, 64/27 F, 27 L, 27 B, 15 B

[56] References Cited

U.S. PATENT DOCUMENTS

| | | | |
|---|---|---|---|
| 1,157,553 | 10/1915 | Kleinow | 64/27 B |
| 1,642,475 | 9/1927 | Wood | 192/106.1 |
| 1,957,114 | 5/1934 | Spase | 64/100 |
| 1,975,772 | 10/1934 | Davis | 192/106.1 |
| 1,997,021 | 4/1935 | Spase | 192/106.1 X |
| 2,360,422 | 10/1944 | Howell | 192/7 |
| 2,945,367 | 7/1960 | Michell | 64/27 B |
| 3,223,214 | 12/1965 | Kuivinen | 64/27 F X |
| 3,362,512 | 1/1968 | Ericson | 64/27 F X |

Primary Examiner—Benjamin W. Wyche
Attorney, Agent, or Firm—Robert M. Leonardi

[57] ABSTRACT

A coupling device such as a clutch comprises a driving member and a driven member operatively connected by a plurality of flat, generally annular and stacked springs. Each spring has a radially extending slit and is therefore C-shaped, with one end portion connected to the drive member. End portions of adjacent springs are circumferentially staggered, with frictional damping forces, in addition to the spring damping forces, thereby created between next adjacent springs upon relative movement between the driving and driven members. Adjacent springs may be adapted to expand and contract, respectively.

13 Claims, 5 Drawing Figures

U.S. Patent  Apr. 10, 1979  Sheet 2 of 3  4,148,385
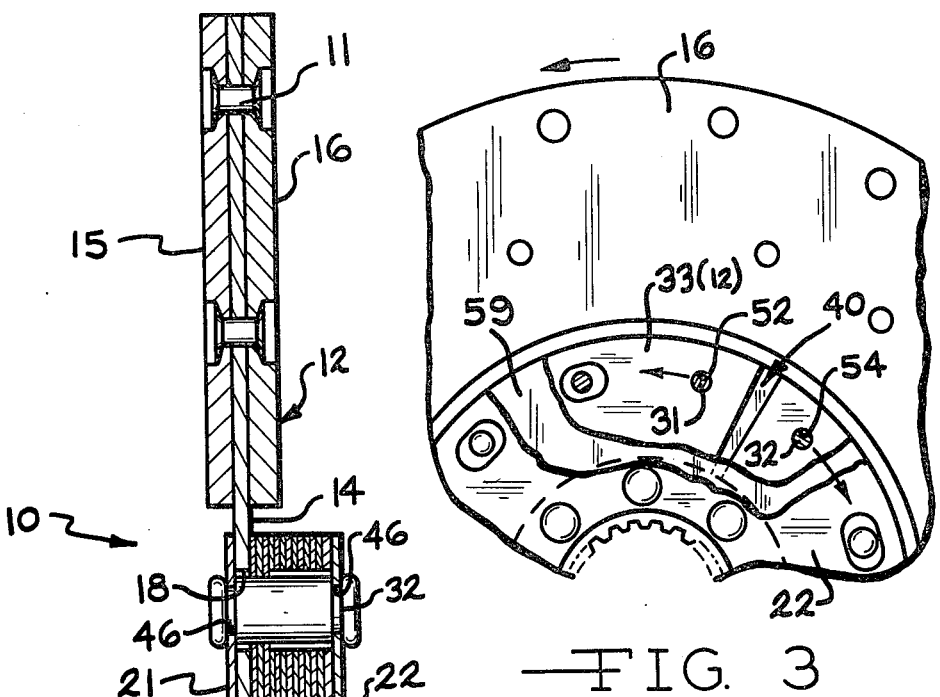
FIG. 3
FIG. 2
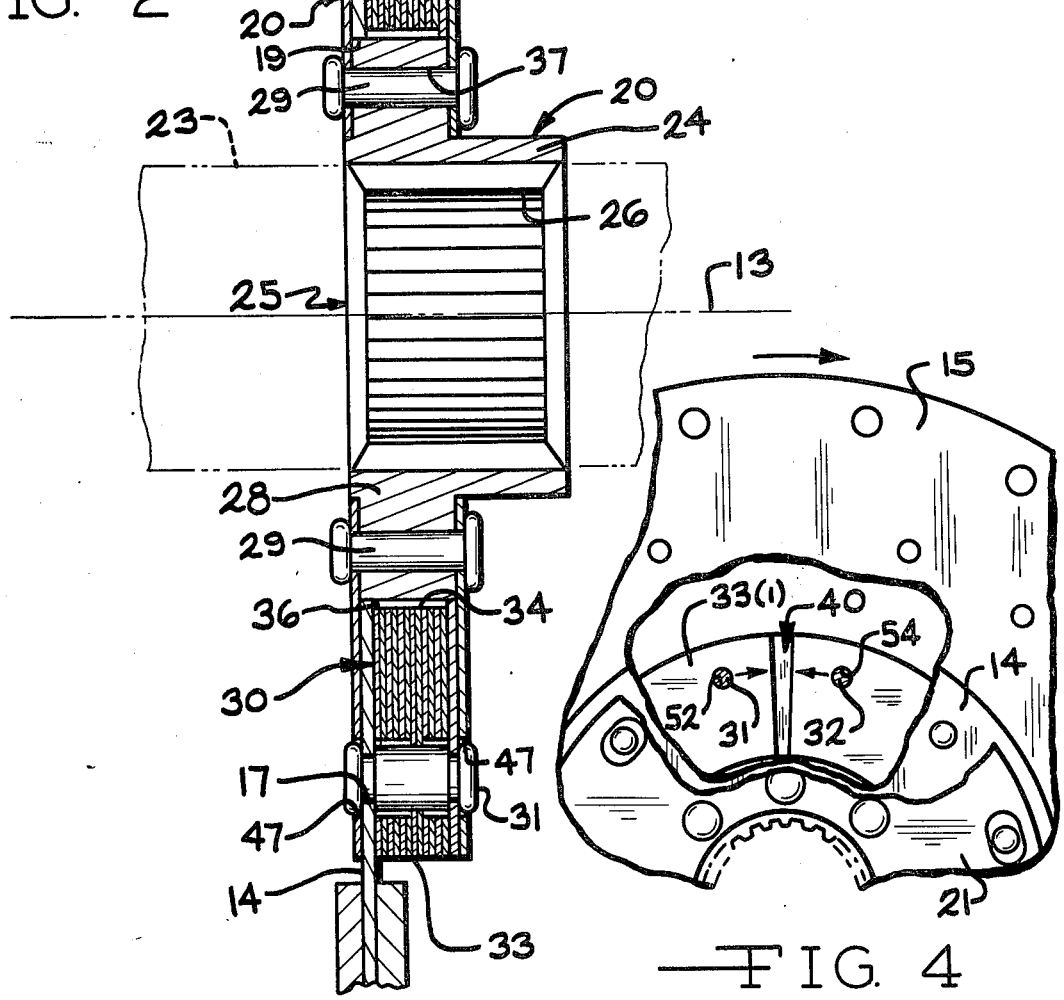
FIG. 4

COUPLING DEVICE WITH SPRING DAMPER

BACKGROUND OF THE INVENTION

This invention relates generally to coupling devices and more particularly to resilient means for drivingly connecting cooperating rotary elements of such devices.

Coupling devices of the present type are widely used for the transmission of power in heavy duty vehicles and other industrial systems. These coupling devices generally include a driving member adapted to be driven by a prime mover and a driven member adapted to transmit torque to another member such as a drive shaft. Means such as coil springs resiliently and drivingly connecting the driving and driven members are usually incorporated into these coupling devices to absorb or prevent shocks and vibrations.

Increases in size and power of prime movers, such as diesel engines utilized in heavy duty trucks, have caused the associated drive train torque loads to increase proportionately. Coupling devices of the present type having conventional means for resiliently and drivingly coupling components thereof have not proved to be entirely satisfactory in absorbing the torsional and vibratory loads produced by modern engines.

Various alternatives have been proposed in an attempt to alleviate these problems. For example, heavy duty clutches for trucks have been provided with several sets of coil springs capable of acting in parallel or in series. Also, several types spring configurations have heretofore been proposed but none has proved to be entirely satisfactory.

SUMMARY OF THE INVENTION

It is an object of the present invention to provide a durable coupling device having high torque capacity and relatively simple means for damping shocks or vibrations.

This and other objects of the present invention which will become apparent from the following detailed description are achieved by the use of stacked C-shaped springs each having one end portion operatively connected to a driving member and the other end portion operatively connected to a driven member of the coupling device. End portions of adjacent springs are circumferentially spaced or staggered to produce substantially even spring resistances at circumferential locations around the device and to create friction between next adjacent springs. In operation, next adjacent springs may be adapted to open and close, respectively, providing an additional friction therebetween.

BRIEF DESCRIPTION OF THE DRAWINGS

FIG. 2 is a cross-sectional side view of the coupling device of FIG. 1 taken along line 2—2.

FIG. 3 is a rear elevation view of a portion of the coupling device of FIGS. 1 and 2 having portions thereof broken away.

FIG. 4 is a front elevation view of a portion of the coupling device of FIGS. 1 and 2 having portions thereof broken away.

DETAILED DESCRIPTION OF A PRESENTLY PREFERRED EMBODIMENT

Figure 1:
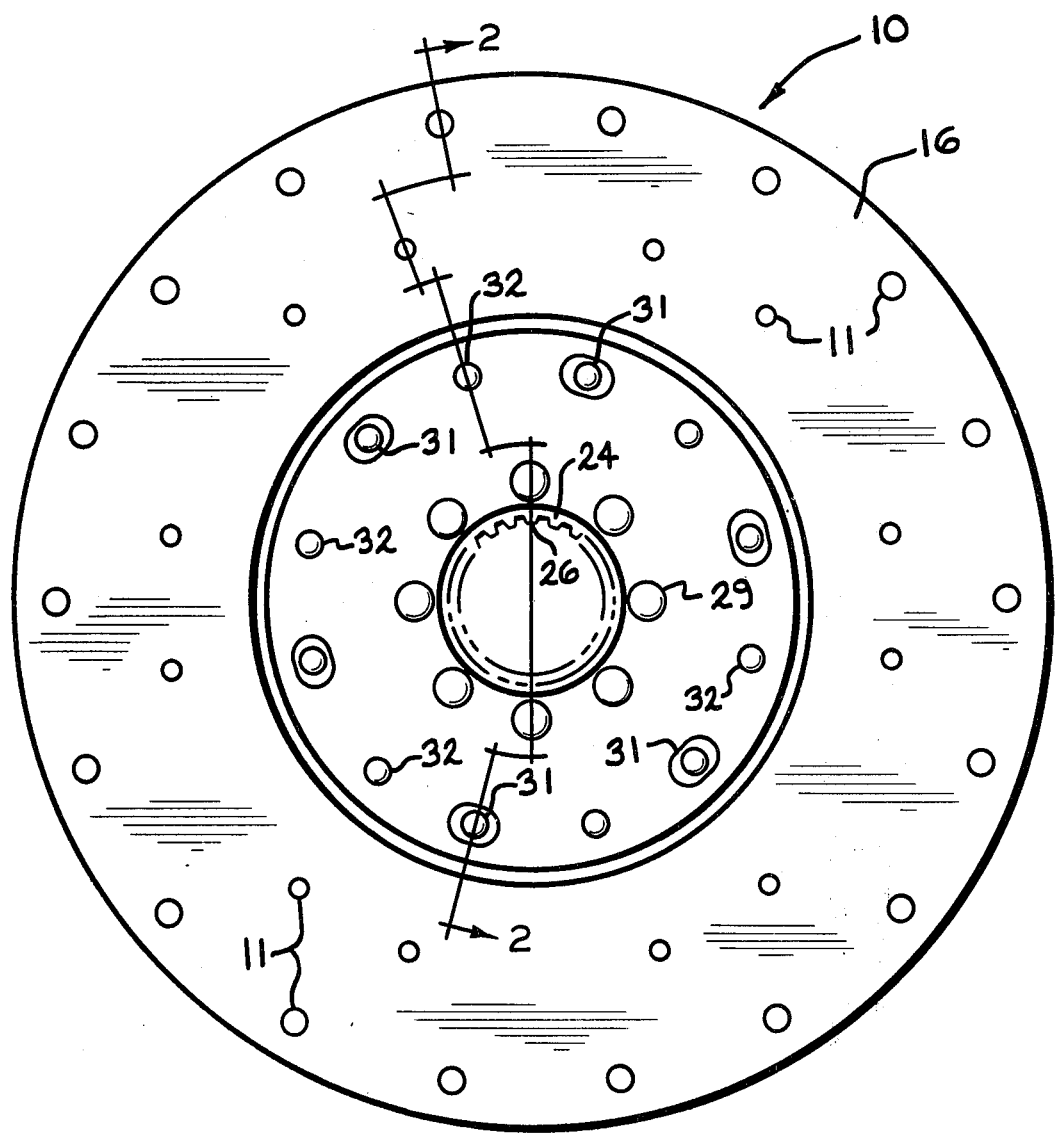
FIG. 1 is a rear elevation view of a clutch type coupling device embodying resilient damping means in accordance with the present invention.

Referring to FIG. 1, a clutch assembly adapted to transmit torque between an engine of a vehicle such as a heavy duty truck and an associated transmission includes a clutch plate 10 adapted to serve as a coupling device between a flywheel and a pressure plate (neither shown). The clutch plate 10 of the presently preferred embodiment is for use in a "dry" clutch, but the present invention may readily be adapted for use in oil cooled clutches which generally have higher torque capacities. As can be seen in FIG. 2, the clutch plate 10, which has a nominal outside diameter of 14 inches (35.56 cm.) in the presently preferred embodiment, comprises three major components: a dirving member 12, a driven member 20 and means 30 for resiliently and drivingly coupling the driving and driven members 12 and 20.

The driving member 12 includes an annular drive plate 14 rotatable about an axis 13. The plate 14 is preferably of a metal having high heat sink characteristics, such as steel. Riveted to opposite sides of the drive plate 14 are substantially identical friction facings 15 and 16 comprised of a material, such as asbestos fiber, having favorable friction characteristics. The facings 15 and 16 are annular and have an outside diameter approximately equal to that of the drive plate 14. Rivets 11 pass through holes in the friction facings and the drive plate 14 to rigidly secure the friction facings thereto.

Figure 5:
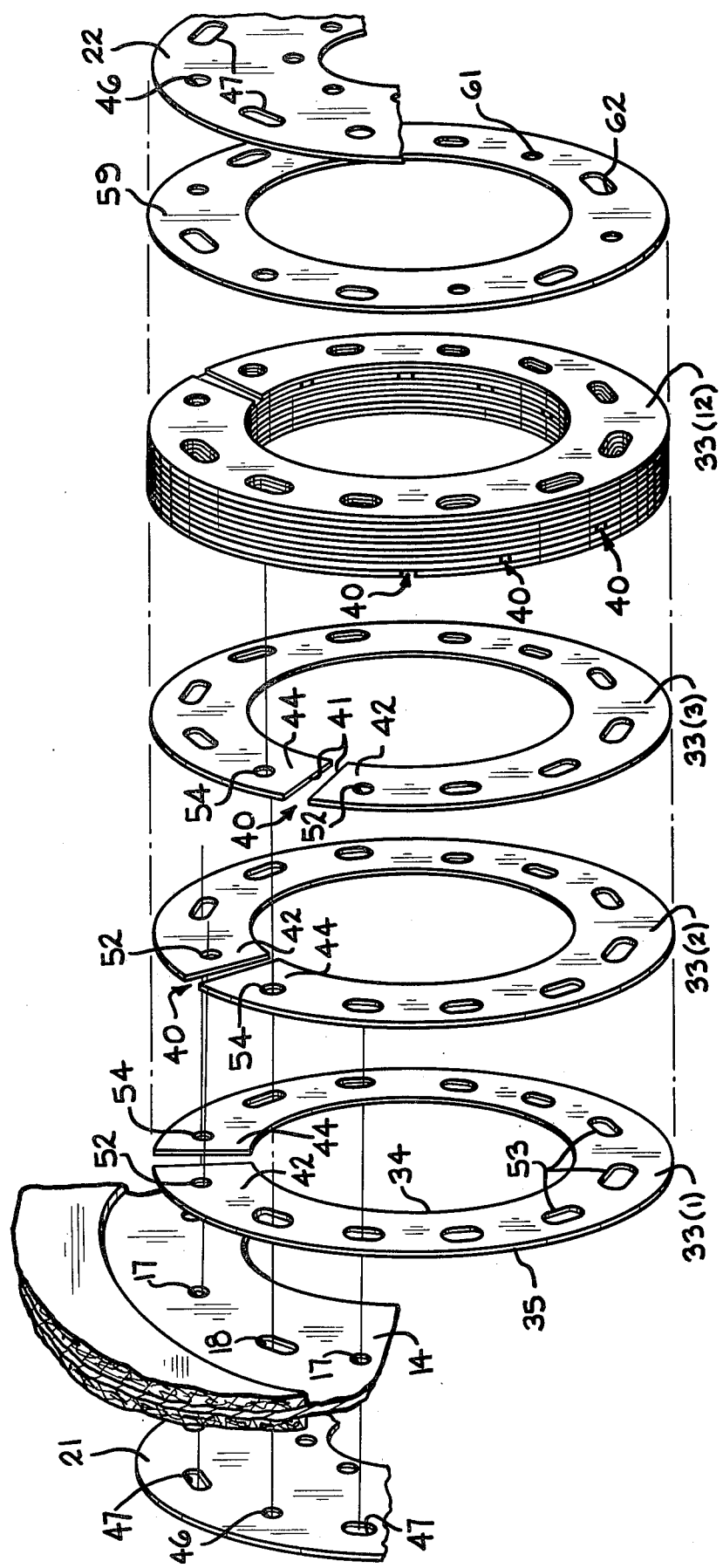
FIG. 5 is an exploded view of the resilient drive means of the coupling device of FIG. 1.

Referring to FIG. 5, six circular bores 17 and six circumferentially elongated slots 18, are defined by the drive plate 14 adjacent its radially inner periphery. The apertures 17 and 18 are alternatingly and generally equally circumferentially spaced about the drive plate. Generally cylindrical driving pins 31 extend through the drive plate bores 17. The diameters of the driving pins 31 and the bores 17 are substantially equal, and the pins 31 are thereby rigidly affixed to the drive plate 14. The driving pins 31 may therefore be considered a part of the driving member 12. Driven pins 32, similar in size and shape to the driving pins 31, extend through the drive plate slots 18, and the drive plate 14 is therefore substantially free to rotate with respect to the driven pins 32 by an amount equal to the circumferential length of the slots 18. The slots 18 may be somewhat wider radially than the diameter of the driven pins 32 to more readily accommodate this relative movement. The drive pins 32 may be considered a part of the driven member 20 as will hereinafter become apparent. In the presently preferred embodiment, both sets of pins 31 and 32 are hardened double ended spacer rivets.

Referring again to FIGS. 1 and 2, the driven member 20 includes a hub 24 rotatable about an axis 13 and having a splined aperture 25 extending axially therethrough. Splines 26 of the hub are adapted to drivingly engage mating splines of an associated shaft 23 extending through the aperture 25. The hub 24 has a generally radially extending flange 28 positioned within the central aperture 19 of the drive plate 14. The outside diameter of the flange 28 is approximately equal to the inside diameter of the drive plate 14 such that an abutting relationship exists therebetween. However, limited relative rotation between the drive plate 14 and hub flange 28 is not prevented.

Two annular and axially spaced cover plates 21 and 22 are rigidly affixed to axially opposite surfaces of the hub flange 28 by a plurality of equal circumferentially spaced rivets 29. The hub flange 28 includes a plurality of circumferentially spaced bores 37, and each cover plate 21 and 22 includes matching bores 38 through which the rivits 29 extend. The cover plates 21 and 22 extend radially outwardly from the hub 24, with the drive plate 14 extending into the axial space therebetween. Similar to the drive plate 14 and as more clearly seen in FIG. 5, each of the cover plates 21 and 22 defines six circular bores 46 and six circumferentially extending slots 47 adjacent its outer periphery. The apertures 46 and 47 are alternatingly and generally equally circumferentially spaced about the cover plates 21 and 22. The size and shape of the bores 46 and slots 47 are substantially identical to those in the drive plate 14. The driven pins 32 extend through the cover plate bores 46 and are thereby rigidly affixed to the cover plates 21 and 22. Driving pins 31 extend through the cover plate slots 47, and the cover plates are substantially free to rotate relative to the drive pins 31 an amount equal to the circumferential length of the slots 47.

Because the slots 47 in the rear cover plate 22 are larger than the heads of the driving pins 31, a thrust washer 59 having a series of circumferentially spaced bores 61 and slots 62 substantially identical to those in the drive plate 14 is provided. The thrust washer 59 is oriented such that the bores 61 are alligned with the slots 47 of the cover plate 22. The bores 61 and slots 62 of the thrust washer are therefore circumferentially aligned with the bores 17 and slots 18 of the drive plate. Driving pins 31 extend through the bores 61 and are thereby rigidly affixed to the thrust washer 59. The thrust washer 59 can therefore be considered a part of the drive member 12.

From the foregoing it can be seen that the driving member 12 and driven member 20 are connected for limited relative rotation by the drive pins 31 and 32 which extend through holes and slots in the components thereof. An operative resilient connection between the driving member 12 and driven member 20 further limits relative rotation. This connection is achieved by the damping means 30 which initially absorbs or prevents transmission of shock loads or torsional vibrations while subsequently providing positive drive to be transmitted from the driving member 12 to the driven member 20.

Referring to FIGS. 2 and 5, twelve generally annular C-shaped springs 33(1) to 33(12) are axially stacked between the drive plate 14 and the thrust washer 59. The springs, having a nominal outside diameter of 7 inches (17.78 cm.) in the presently preferred embodiment, are identical to each other and are generally concentric with the hub 24. Each spring 33 is blanked out of pre-heat treated clock spring steel having a thickness of about 0.030 inches (0.076 cm.). However, the spring thickness may be varied from about 0.010 inches (0.025 cm.) to about 0.050 inches (0.127 cm.) depending upon factors such as the damping required, the diameter of the springs, etc. In keeping within this range of spring thickness, shot blasting, additional heat treating, or other types of stress relieving of the pre-heat treated steel is not generally required as with thicker springs. Furthermore, relatively thin springs such as disclosed herein have a generally rectangular cross-section and edge finishing is therefore not generally required.

The outer diameter of the springs 33 is approximately equal to the outer diameter of the cover plates 21 and 22. The inner diameter of the springs is somewhat larger than that of the hub flange 28, a space 36 thereby provided therebetween. Each spring 33 has a generally radially extending slit 40 which gives the spring a "C-shape". Each radial slit 40 defines two radially extending walls 41 and two circumferentially spaced end portions, a spring drive portion 42 and a spring driven portion 44. As is most clearly seen in FIG. 5, the radial slits 40 of the springs are uniformly circumferentially spaced or staggered. In the presently preferred embodiment, each radial slit 40 is spaced 30° from the radial slits of the next adjacent springs. Staggering of the radial slits 40 is desirable to provide uniform circumferential load distribution throughout the damping means 30. A uniform load distribution may decrease distortion, and therefore wear, of the clutch facings 15 and 16. The staggering of radial slits 40 of next adjacent spring 33 also provides friction between next adjacent springs as will hereinafter be described. Furthermore, staggering of the slits 40 spreads the torque and load among several pins 31 and 32, rather than allowing two pins to carry all the load.

Twelve apertures are generally equally circumferentially spaced adjacent the outer periphery 35 of each spring 33. A pin 31 or 32 extends through each aperture of each spring 33. Ten apertures of each spring are circumferentially extending slots 53 substantially similar in shape to the drive plate slots 18 and the cover plate slots 47. However, the spring slots 53 are wider than the slots 18 and 47 to more readily accommodate both circumferential and radial movement between the pins 31 and 32 and the respective portion of the spring 33. The remaining two apertures are circular bores, a drive bore 52 and a driven bore 54, located in the spring end portions 42 and 44, respectively. Bores 52 and 54 are approximately equal in diameter to the pins 31 and 32 which pass therethrough, respectively. The driving pin 31 and driven pin 32 are thereby drivingly affixed to a driven portion 42 and driven portion 44, respectively, of each spring 33(1) to 33(12).

For a more thorough understanding of the present invention, the operation of the preferred illustrated coupling device as used in a clutch can be described as follows. The clutch plate 10 of the presently preferred embodiment is adapted to be utilized in a clutch assembly including a flywheel (not shown) adapted for driving engagement with the front friction facing 15. The assembly also includes a clutch cover (not shown) having a pressure plate adapted to drivingly engage the rear friction facing 16. The pressure plate is axially movable along the splined shaft 25 to selectively drive or release the clutch plate 10 into or from engagement with the flywheel, as is well known in the art.

In a typical heavy duty truck the flywheel is driven directly by the engine output shaft. As the friction facing 15 is brought into engagement with the flywheel, torque is transmitted from the friction facings to drive plate 14 and then to the driving pins 31 extending through the drive plate bores 17. The six spaced driving pins 31 transmit torque to the twelve springs 33 at their respective spring drive portions 42 which are rigidly affixed to the pins 31. This torque has a tendency to rotate the springs 33. However, rotation of the springs is resisted by the load upon the vehicle because the spring driven portions 44 are rigidly attached to the driven pins 32, the cover plates 22, and the hub 20, as previously described. The opposing forces cause the springs 33 to expand or contract (i.e., cause the radial slit 40 to open or close as will hereinafter be described), the amount of expansion or contraction being proportional to the driving force applied. Shocks or vibrations due to sudden accelleration are therefore absorbed or dampened. After accelleration, the springs 33 have a tendency to return to their equilibrium or free-standing positions.

Frictional damping forces are created in the damping means of present invention regardless of whether next adjacent springs 33 are oriented to act in the same direction, e.g. both open (expand) or close (contract), under a given load, or whether alternating springs 33(1), 33(3), 33(5) etc. act in one direction, (e.g. open) while the others 33(2), 33(4), 33(6) etc. act in the opposite direction (e.g. close) for a given load. If all springs 33 are oriented to act in the same direction, limited radial and circumferential friction is created because relative radial and circumferential expansion or contraction occurs between portions of next adjacent staggered springs 33. This occurs because each set of pins 31 or 32 holds the end portions 42 or 44, respectively, equidistant from the other end portions 44 or 42, respectively, while mid-portions between the end portions 42 and 44 are forced to radially and circumferentially expand or contract. The spring slots 53 around the periphery of the spring accomodate circumferential movement and radial expansion or contraction of intermediate portions of the springs. Because the end portions 42 and 44 of next adjacent springs are staggered, the mid-portions of next adjacent springs are in contact with the end portions. Relative movement therebetween, causing friction, is therefore unavoidable.

This friction is desirable because it is an additional damping force which absorbs shocks or vibrations which would otherwise be transmitted between the driving member 12 and driven member 20. The amount of friction created between next adjacent springs is dependent upon the clamping force exerted on the spring stack by the drive pins 31 and 32. This clamping force can be obviously be varried as required to produce a desired level of inter-spring friction.

In the presently preferred embodiment the slits 40 of next adjacent springs are staggered by one pin 31 or 32, i.e. by 30° because there are twelve such pins (see FIGS. 3, 4 and 5). The spring drive portion 42 and spring driven portion 44 are therefore reversed on next adjacent springs. Next adjacent springs act in opposite circumferential and radial directions under a given load, i.e., one spring radially expands or circumferentially opens while another radially contracts or circumferentially closes. This relative movement between next adjacent springs 33 creates additional frictional forces between the springs which add to the damping force of the damping means 30.

Referring to FIG. 3, it can be seen that the radial slit 40 of the spring 33(12) extends between two pins 31 and 32. When a driving force is applied to the spring 33(12) by the driving pin 31 in a counter-clockwise direction as viewed in FIG. 3, counter-clockwise rotation of the spring 33(12) will be resisted by the load applied through the driven pin 32. The resulting forces (illustrated by arrows extending in opposite circumferential directions) cause the slit 40 to circumferentially open. It should be noted that the driving force applied through driving pin 31 will be greater than the load applied through driven pin 32 for the clutch plate to rotate. In FIG. 4, it can be seen that the radially extending slit 40 of spring 33(1) has a tendency to circumferentially close under the forces (illustrated by arrows) applied by the pins 31 and 32 as the driving pin 31 is driven in the same direction (seen as clockwise in FIG. 4).

Two means are provided for positively limiting the amount of C-spring expansion and contraction. Firstly, circumferential expansion and contraction of each C-spring is limited to a range provided by the circumferential length of the slots 53, as they limit relative movement of the pins 31 and 32. Secondly, the C-springs can circumferentially close only until the walls 41 of the radially extending gap 40 abutt, i.e. until the gap 40 is completely closed.

It should be noted that the opening and closing of next adjacent springs under a driving force in the presently preferred embodiment are reversed of the driving force is applied in an opposite direction. Thus, when the driven member 20 drives the driving member 12, as for example when the vehicle begins to coast, the driven pins 32 become driving pins.

When a spring 33 expands or opens, its inner periphery is put into tension and its outer periphery is put into compression. It is preferable from a torque carrying standpoint that the springs 33 contract or close under load. However, it may be desirable for other reasons, such as added frictional damping forces, for next adjacent springs to act in opposite directions.

Several methods are available for designing adjacent springs to act in opposite directions under a given load. Generally, however, these methods all require that the spring slot 40 of next adjacent springs extend on opposite circumferential sides of a driving pin 31. This can also be considered as staggering the spring end portions 42 or 44 by one driving pin 31. The slits 40 of next adjacent springs 33 are thus positioned on either side of a pin 31 or 32. The slits 40 or end portions 42 or 44 may also be staggered by every third pin, or 90° in the present embodiment. Further modifications are obviously available.

If the additional frictional force obtained by oppositely acting springs is not required, the springs may be arranged such that the slits 40 are staggered every second pin 31 or 32, whereby all of the springs either expand or contract, as desired, under a given direction of force applied to the drive member 12. This may be accomplished by staggering slits 40 of next adjacent springs by two pins, i.e., 60°. Several other alternatives will also be obvious to anyone skilled in the art.

The load carrying capability of a C-shaped spring, such as the springs 33, depends among other things upon the angular or arcuate distance through which forces are applied. In the presently preferred embodiment, forces are applied to the springs 33 through an arcuate length of 330° because each spring is drivingly attached to pins 31 and 32 which are spaced 330° apart. The arcuate span of the radial slit 40 of each spring has virtually no effect upon the spring constant, but the small width of the slits 40 (less than 5° in the present embodiment) allows more spring surface area of effect frictional engagement with next adjacent springs. For a greater load carrying capabilities a spring 33 may be drivingly attached to pins 31 and 32 which are, for example, spaced 90° apart, giving the spring an effective arcuate length of 270°.

Depending upon the intended use, it may be desirable to increase or decrease the torque carrying capabilities of the damping means 30. This may be done by adding more springs such as 33 (for example, another set of twelve so that they may be evenly staggered) or by removing springs (for example, every second or third spring, depending upon the capabilities required and whether it is desirable to provide maximum friction between next adjacent springs). Torque carrying capabilities may also be varied by increasing or decreasing the length, width or thickness of the springs, or by changing the materials from which the springs are made. It should also be noted that two sets each of the pins 31 and 32 may be used to secure each C-spring if the torque is great enough to require additional load distribution.

Although the foregoing structure has been described for the purpose of illustrating a presently preferred embodiment of the invention, it should be understood that many modifications or alterations may be made without departing from the spirit and the scope of the invention as set forth in the appended claims and that the coupling device can be used other than in a clutch; for example, as a torsional damper or a yieldable coupling.

I claim:

1. A coupling device comprising a rotatable driving member, a rotatable driven member, and a plurality of stacked and generally C-shaped springs connecting said driving member and said driven member, each of said springs having two end portions, said two end portions lying in a plane generally perpendicular to the axis of rotation of at least one of said rotatable driving member and said rotatable driven member, said planes of each of said springs being spaced along said axis, one of said end portions of each spring operatively connected to said driving member and the other of said end portions of each spring operatively connected to said driven member, wherein said end portions of said springs are staggered about the circumference of at least one of said driving and driven members.

2. A coupling device as defined in claim 1 further comprising means for opening one of said plurality of springs when a next adjacent spring closes.

3. A coupling device comprising a rotatable driving member, a rotatable driven member, and a plurality generally annular and stacked springs connecting said driving member and said driven member, each of said springs lying in a plane generally perpendicular to the axis of rotation of least one of said rotatable driving member and said rotatable driven member, each of said planes being spaced along said axis, each of said springs comprising a generally radially extending slit defining a spring drive portion on one circumferential side of said slit and a spring driven portion on the other circumferential side of said slit, wherein said spring drive portion is operatively connected to said driving member and said spring driven portion is operatively connected to said driven member, and wherein said slits in said springs are spaced about the circumference of at least one of said driving and driven members.

4. A coupling device as defined in claim 3 wherein each of said plurality of springs are rotatable about a common axis.

5. A coupling device as defined in claim 3 further comprising means for opening one of said plurality of springs when a next adjacent spring closes.

6. A coupling device as defined in claim 3 further comprising a plurality of equally circumferentially spaced pins, wherein alternating ones of said pins are rigidly affixed to said driving member and drivingly affixed to a spring drive portion of at least one of said springs and wherein other alternating ones of said pins are rigidly affixed to said driven member and drivingly affixed to a spring driven portion of at least one of said springs.

7. A coupling device as defined in claim 6 wherein said slits of next adjacent springs extend on either side of one of said plurality of pins.

8. A coupling device as defined in claim 7 wherein each of said plurality of springs defines a plurality of apertures and wherein one of said plurality of pins extends through one of said plurality of apertures.

9. A coupling device as defined in claim 8 wherein one of said apertures is defined within each of said spring drive portion and said spring driven portion, and wherein said pins extending through said spring drive portion aperture and said spring driven portion aperture are rigidly associated therewith.

10. A coupling device as defined in claim 9 wherein said pins are generally cylindrical, and wherein said spring drive portion aperture and said spring driven portion aperture are generally circular and have a diameter substantially equal to the diameter of said pins, and wherein said apertures circumferentially spaced from said spring drive portion and spring driven portion apertures are generally circumferentially extending slits.

11. A coupling device as defined in claim 10 consisting of an identical number of said drive pins and said springs.

12. A coupling device comprising a rotatable driving member, a rotatable driven member, and a plurality of axially stacked and generally C-shaped springs connecting said driving member and said driven member, each of said springs having two end portions, said two end portions lying in a plane generally perpendicular to the axis of rotation of at least one of said rotatable driving member and said rotatable driven member, one of said end portions of each spring operatively connected to said driving member and the other of said end portions of each spring operatively connected to said driven member, wherein said end portions of said springs are circumferentially staggered, and means for moving next adjacent springs relative to each other in opposite circumferential directions upon relative circumferential movement between said driving member and said driven member.

13. A coupling device comprising a rotatable driving member, a rotatable driven member, and a plurality generally flat, annular and axially stacked springs connecting said driving member and said driven member, each of said springs comprising a generally radially extending slit defining a spring drive portion on one circumferential side of said slit and a spring driven portion on the other circumferential side of said slit, wherein said spring drive portion is operatively connected to said driving member and said spring driven portion is operatively connected to said driven member, and wherein said slits in said springs are circumferentially spaced, and means for moving next adjacent springs relative to each other in opposite circumferential directions upon relative circumferential movement between said driving member and said driven member.

* * * * *